US012650317B2

(12) United States Patent
Jang et al.

(10) Patent No.: US 12,650,317 B2
(45) Date of Patent: Jun. 9, 2026

(54) APPARATUS FOR PREVENTING MISRECOGNITION OF OBJECT IN VEHICLE AND METHOD THEREFOR

(71) Applicants: Hyundai Motor Company, Seoul (KR); Kia Corporation, Seoul (KR)

(72) Inventors: Jae Hwan Jang, Ulsan (KR); Seo Hyeon Park, Suwon (KR); Jeong Am Seo, Goyang (KR); Kwang Yeon Kim, Seoul (KR); Young Min Han, Gunpo (KR); Sung Yeon Ko, Hanam (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 206 days.

(21) Appl. No.: 18/107,644

(22) Filed: Feb. 9, 2023

(65) Prior Publication Data

US 2024/0044669 A1    Feb. 8, 2024

(30) Foreign Application Priority Data

Aug. 8, 2022    (KR) ........................ 10-2022-0098723

(51) Int. Cl.
| | |
|---|---|
| *G05D 1/00* | (2024.01) |
| *G01C 21/00* | (2006.01) |
| *G06V 10/30* | (2022.01) |
| *G06V 20/56* | (2022.01) |

(52) U.S. Cl.
CPC ..... *G01C 21/3841* (2020.08); *G01C 21/3815* (2020.08); *G01C 21/3896* (2020.08); *G06V 10/30* (2022.01); *G06V 20/56* (2022.01)

(58) Field of Classification Search
CPC .................................................. G01C 21/3841
See application file for complete search history.

(56) References Cited

U.S. PATENT DOCUMENTS

| | | | |
|---|---|---|---|
| 7,397,351 B1* | 7/2008 | Rubin .................... | B60Q 9/008 |
| | | | 340/436 |
| 10,384,679 B2 | 8/2019 | Fujita et al. | |
| 10,628,712 B2 | 4/2020 | Jiang et al. | |
| 11,315,317 B2 | 4/2022 | Yu et al. | |
| 2014/0111369 A1* | 4/2014 | Oh ........................ | G06V 20/588 |
| | | | 342/52 |
| 2018/0101177 A1 | 4/2018 | Cohen | |

(Continued)

FOREIGN PATENT DOCUMENTS

| | | |
|---|---|---|
| JP | 2005-128603 A | 5/2005 |
| JP | 2010-102485 A | 5/2010 |

(Continued)

*Primary Examiner* — Vivek D Koppikar
*Assistant Examiner* — Paul W Arellano
(74) *Attorney, Agent, or Firm* — Fox Rothschild LLP

(57) ABSTRACT

An apparatus configured to prevent misrecognition of an object in a vehicle and a method therefor are provided. The apparatus may comprise a sensor module configured to collect vehicle data and at least one processor electrically connected to the sensor module. The at least one processor may be configured to set a first region through which a moving object is unable to pass, based on the vehicle data collected by means of the sensor module and map data and removes noise corresponding to at least one moving object, when the at least one moving object is detected in the first region. In addition, various embodiments recognized through the specification are possible.

16 Claims, 10 Drawing Sheets

(56)     References Cited

U.S. PATENT DOCUMENTS

| | | | |
|---|---|---|---|
| 2018/0253625 A1 | 9/2018 | Jiang et al. | |
| 2018/0273031 A1* | 9/2018 | Fujita ..................... | G01C 21/30 |
| 2020/0180656 A1* | 6/2020 | Kim ................. | B60W 30/0956 |
| 2021/0327128 A1 | 10/2021 | Yu et al. | |
| 2022/0001895 A1* | 1/2022 | Inaba ............. | B60W 30/18145 |

FOREIGN PATENT DOCUMENTS

| | | |
|---|---|---|
| JP | 2018-534603 A | 11/2018 |
| JP | 6477903 B2 | 3/2019 |
| KR | 2019-0064228 A | 6/2019 |
| KR | 2020-0096409 A | 8/2020 |

* cited by examiner

APPARATUS FOR PREVENTING MISRECOGNITION OF OBJECT IN VEHICLE AND METHOD THEREFOR

CROSS-REFERENCE TO RELATED APPLICATION(S)

This application claims, under 35 U.S.C. § 119(a), the benefit of Korean Patent Application No. 10-2022-0098723, filed in the Korean Intellectual Property Office on Aug. 8, 2022, the disclosure of which is incorporated herein by reference in its entirety.

BACKGROUND

Technical Field

Embodiments of the present disclosure relate to an apparatus configured to prevent misrecognition of an object in a vehicle and a method therefor, and, more particularly, to technologies of preventing an object from being misrecognized using a high-definition map.

Background

Vehicles generally comprise various systems configured for protecting a driver and a passenger, assisting driving, and improving ride quality. Such systems have been improved and developed using various sensors and information communication technology. A technology for recognizing lines, using an image sensor and performing automatic steering by means of a camera, has been put into practical use. In general, an image recognition processing device may be provided in the vehicle in order to detect image information of road lines, image information about a following vehicle, and image information of left and right lines, and may be configured to output the detected information through a display in order to provide a driver with lines, a situation of the road, and driving information of a surrounding vehicle.

Recently, a sensor fusion system capable of fusing image information and radar information, which are collected by means of the image sensor and the radar sensor, and capable of extracting and using necessary information, has been developed. However, since street trees, other buildings, or the like, except for a vehicle, are recognized as dynamic objects when there is vibration in the sensor itself (because a large amount of ghosts occur or noise occurs), there is a high probability that another object is misrecognized. Ghosts are objects, such as a building or a street tree, which are not moved but are determined as a dynamic object, which is an abnormality. This abnormality is recognized by means of noise caused by radar frequency diffuse reflection.

Meanwhile, ghosts are one of the factors which provide a user with unnecessary deceleration during autonomous driving. Ghosts mainly occur by misrecognizing a road boundary, such as a guardrail, a wall, or an upper structure, as a dynamic object. As such, when deceleration occurs by misrecognizing a ghost as a dynamic object, the ride quality of the user may be degraded.

SUMMARY

The present disclosure has been made to solve at least the above-mentioned problems occurring in the existing technologies while advantages achieved by the existing technologies are maintained intact.

According to an object of the present disclosure, an apparatus configured to prevent misrecognition of an object in a vehicle to overcome a problem in which a ghost is misrecognized as a dynamic object using only sensor information, and a method therefor, are provided.

According to an object of the present disclosure, an apparatus configured to prevent misrecognition of an object in a vehicle in order to prevent unnecessary deceleration from occurring because of misrecognizing a ghost as a dynamic object, and a method therefor, are provided.

The technical problems to be solved by the present disclosure are not limited to the aforementioned problems, and any other technical problems not mentioned herein will be clearly understood from the following description by those skilled in the art to which the present disclosure pertains.

According to an object of the present disclosure, an apparatus configured to prevent misrecognition of an object in a vehicle may comprise a sensor module configured to collect vehicle data and at least one processor electrically connected to the sensor module. The at least one processor may be configured to set a first region through which a moving object is unable to pass, based on the vehicle data collected by means of the sensor module and map data and may remove noise corresponding to at least one moving object, when the at least one moving object is detected in the first region.

According to an exemplary embodiment, the apparatus may further comprise a memory. The at least one processor may be configured to determine a location of the vehicle, based on the vehicle data and the map data and may be configured to set the first region based on the determined location of the vehicle and the map data. The map data may be stored in the memory and/or may be received from outside of the vehicle.

According to an exemplary embodiment, the at least one processor may be configured to obtain information about a road boundary around the vehicle based on a location of the vehicle and the map data to set the first region. The information about the road boundary may comprise information about at least one of a first road boundary through which the moving object is unable to pass or a second road boundary through which the moving object is able to pass.

According to an exemplary embodiment, the first road boundary through which the moving object is unable to pass may comprise at least one of a guardrail, a wall, or an upper structure. The second road boundary through which the moving object is able to pass may comprise at least one of a curb stone or an eye-catching rod.

According to an exemplary embodiment, the at least one processor may be configured to collect environmental information around the vehicle based on the location of the vehicle and the map data to set the first region, when it is determined that there is a road boundary through which the moving object is unable to pass, based on the information about the road boundary, and may be configured to determine whether there is a side space around the road boundary based on the environmental information around the vehicle.

According to an exemplary embodiment, the at least one processor may be configured to set a width of the first region to a first value based on a width of a driving lane of the vehicle, when it is determined as an environment where there is the side space, and may be configured to set the width of the first region to a second value based on the width of the driving lane of the vehicle, when it is determined as an environment where there is no side space. The first value may be greater than the second value.

According to an exemplary embodiment, the map data may comprise a centerline of a driving lane of the vehicle and the road boundary. The centerline of the driving lane of the vehicle and the road boundary may comprise a set of points.

According to an exemplary embodiment, the at least one processor may be configured to remove noise corresponding to at least one moving object, when a location of the at least one moving object overlaps the first road boundary.

According to an exemplary embodiment, the at least one processor may be configured to remove noise corresponding to the at least one moving object, when a straight line indicating a shortest distance between a boundary center point behind the at least one moving object and a centerline of a driving lane of the vehicle is adjacent to the first road boundary.

According to an exemplary embodiment, the sensor module may comprise a sensor fusion system. The at least one processor may be configured to fuse pieces of data collected in real time by means of the sensor fusion system in order to obtain the vehicle data.

According to another object of the present disclosure, a method configured to prevent misrecognition of an object in a vehicle is provided. The method may comprise setting, by at least one processor, a first region through which a moving object is unable to pass, based on vehicle data collected by means of a sensor module and map data, and removing, by the at least one processor, noise corresponding to at least one moving object, when the at least one moving object is detected in the first region.

According to an exemplary embodiment, the setting of the first region may comprise determining, by the at least one processor, a location of the vehicle, based on the vehicle data and the map data, and setting, by the at least one processor, the first region based on the determined location of the vehicle and the map data. The map data may be stored in a memory or may be received from outside of the vehicle.

According to an exemplary embodiment, the method may further comprise obtaining, by the at least one processor, information about a road boundary around the vehicle based on a location of the vehicle and the map data to set the first region. The information about the road boundary may comprise information about at least one of a first road boundary through which the moving object is unable to pass or a second road boundary through which the moving object is able to pass.

According to an exemplary embodiment, the first road boundary through which the moving object is unable to pass may comprise at least one of a guardrail, a wall, or an upper structure. The second road boundary through which the moving object is able to pass may comprise at least one of a curb stone or an eye-catching rod.

According to an exemplary embodiment, the method may further comprise collecting, by the at least one processor, environmental information around the vehicle based on the location of the vehicle and the map data to set the first region, when it is determined that there is a road boundary through which the moving object is unable to pass, based on the information about the road boundary, and determining, by the at least one processor, whether there is a side space around the road boundary based on the environmental information around the vehicle.

According to an exemplary embodiment, the method may further comprise setting, by the at least one processor, a width of the first region to a first value based on a width of a driving lane of the vehicle, when it is determined as an environment where there is the side space, and setting, by the least one processor, the width of the first region to a second value based on the width of the driving lane of the vehicle, when it is determined as an environment where there is no side space. The first value may be greater than the second value.

According to an exemplary embodiment, the map data may comprise a centerline of a driving lane of the vehicle and the road boundary. The centerline of the driving lane of the vehicle and the road boundary may comprise a set of points.

According to an exemplary embodiment, the removing of the noise corresponding to the at least one moving object may comprise removing, by the at least one processor, the noise corresponding to the at least one moving object, when a location of the at least one moving object overlaps the first road boundary.

According to an exemplary embodiment, the removing of the noise corresponding to the at least one moving object may comprise removing, by the at least one processor, the noise corresponding to the at least one moving object, when a straight line indicating a shortest distance between a boundary center point behind the at least one moving object and a centerline of a driving lane of the vehicle is adjacent to the first road boundary.

According to an exemplary embodiment, the sensor module may comprise a sensor fusion system. The method may further comprise fusing, by the at least one processor, pieces of data collected in real time by means of the sensor fusion system to obtain the vehicle data.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
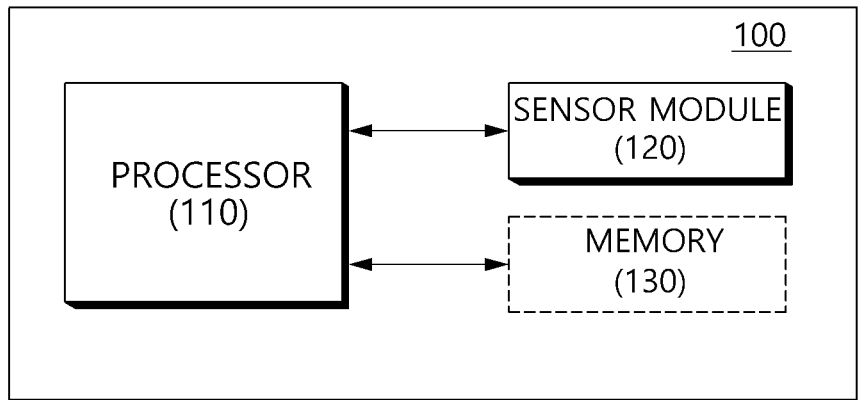
FIG. 1 is a block diagram of an apparatus configured to prevent misrecognition of an object in a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 9.

FIG. 1 is a block diagram of an apparatus configured to prevent misrecognition of an object in a vehicle according to an exemplary embodiment of the present disclosure.

Referring to FIG. 1, an apparatus 100 configured to prevent misrecognition of an object in a vehicle according to an exemplary embodiment may comprise a processor 110, a sensor module 120, and a memory 130. In various embodiments, the apparatus 100 configured to prevent the misrecognition of the object in the vehicle may comprise an additional component other than the components shown in FIG. 1, or may omit at least one of the components shown in FIG. 1.

According to an exemplary embodiment, the processor 110 may be electrically connected with sensor module 120 and the memory 130 and may be configured to electrically control the respective components. The processor 110 may be an electrical circuit which executes instructions of software and may be configured to perform a variety of data processing and calculation described below.

According to an exemplary embodiment, the processor 110 may comprise, for example, an electronic control unit (ECU), a micro controller unit (MCU), or another sub-controller, which is loaded into the vehicle.

According to an exemplary embodiment, the processor 110 may be configured to execute calculation and data processing about control and/or communication of at least one other component of the apparatus 100 configured to prevent the misrecognition of the object in the vehicle using instructions stored in the memory 130. Detailed contents associated with an operation of the processor 110 will be described below with reference to FIGS. 2, 4, 5, and 6.

According to an exemplary embodiment, the sensor module 120 may comprise a sensor fusion system.

According to an exemplary embodiment, the sensor module 120 may comprise, but is not limited to, a radio detection and ranging (RaDAR), a light detection and ranging (Li-DAR), and a camera. The sensor module 120 may comprise various sensors capable of collecting vehicle data.

According to an exemplary embodiment, the RaDAR may be configured to scan an area in front of the vehicle to detect an object on the road (or the driving lane).

According to an exemplary embodiment, the RaDAR may be configured to emit electromagnetic waves of microwaves to an object and may be configured to receive electromagnetic waves reflected from the object to detect a distance from the object, a direction of the object, an altitude of the object, or the like.

According to an exemplary embodiment, the LiDAR may be configured to scan a forward area using laser beams having properties close to radio waves to detect an object on the road.

According to an exemplary embodiment, the camera may be installed in the vehicle to obtain camera data including preceding vehicle information and/or line information, based on image processing of the obtained image.

According to an exemplary embodiment, the memory 130 may be configured to store vehicle data collected by the sensor module 120 under control of the processor 110.

According to an exemplary embodiment, the memory 130 may be configured to store various logic, algorithms, and programs required in a process of interworking with the sensor module 120 to obtain and record vehicle data.

For example, the memory 130 may comprise at least one type of storage medium such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

Figure 2:
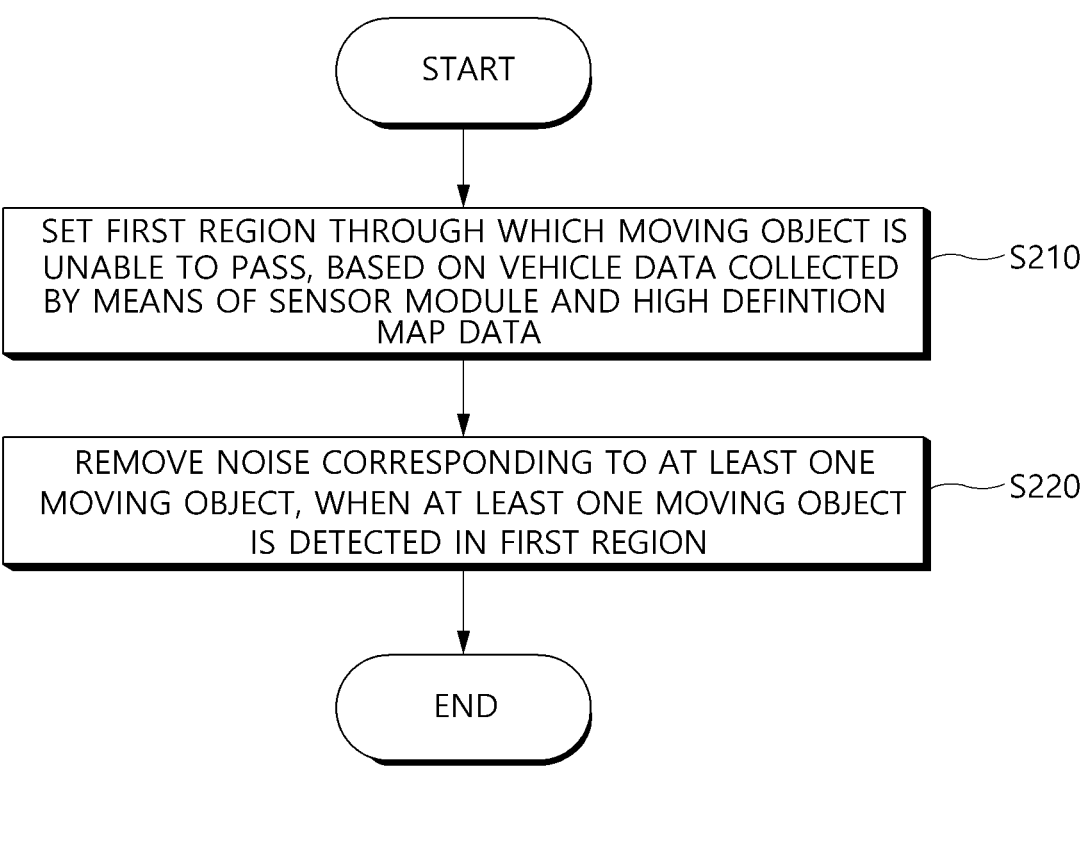
FIG. 2 is a flowchart illustrating a method for preventing misrecognition of an object in a vehicle according to an exemplary embodiment of the present disclosure.

FIG. 2 is a flowchart illustrating a method for preventing misrecognition of an object in a vehicle according to an exemplary embodiment of the present disclosure.

Operations in S210 and S220 in an exemplary embodiment below may be sequentially performed, but are not necessarily sequentially performed. For example, an order of the respective operations may be changed, and at least two operations may be performed in parallel.

Referring to FIG. 2, in the apparatus configured to prevent the misrecognition of the object in the vehicle and the method therefor, in S210, a processor may be configured to set a first region through which a moving object is unable to pass, based on vehicle data collected by means of a sensor module and map data. Hereinafter, in the present disclosure, the first region may be referred to as a region of interest.

According to an exemplary embodiment, the processor may be configured to fuse pieces of data collected in real time by means of a sensor fusion system and may be configured to determine a current location of the vehicle, using the fused vehicle data and map data.

For example, the map data may be stored in a memory or may be received from the outside of the vehicle.

According to an exemplary embodiment, the processor may be configured to set the first region through which the moving object is unable to pass, based on the determined current location of the vehicle and the map data.

According to the above-mentioned embodiment, the apparatus configured to prevent the misrecognition of the object in the vehicle according to an exemplary embodiment of the present disclosure may be configured to determine a region where a moving object is unable to be present, using the map as well as data obtained by means of the sensor, thus reducing a probability that a ghost will be misrecognized as a dynamic object.

According to an exemplary embodiment, in S220, when at least one moving object is detected in the first region, the processor may be configured to remove noise corresponding to the at least one moving object. Hereinafter, in the present disclosure, noise may be referred to as a ghost.

According to an exemplary embodiment, when it is determined that there is the at least one moving object in the first region through which the moving object is unable to pass, the processor may be configured to remove noise (or a ghost) corresponding to the at least one moving object.

For example, when the location of the at least one moving object overlaps a first road boundary (e.g., a guardrail, a wall, or an upper structure) through which the moving object is unable to pass, the processor may be configured to remove noise for the at least one moving object.

Furthermore, furthermore, when a straight line indicating a shortest distance between a boundary center point behind the at least one moving object and a centerline of the driving lane of the vehicle is adjacent to the first road boundary, the processor may be configured to remove noise corresponding to the at least one moving object.

According to the above-mentioned embodiment, the apparatus configured to prevent the misrecognition of the object in the vehicle according to an exemplary embodiment of the present disclosure may be configured to determine a region where a moving object is unable to be present physically, using the map as well as data obtained by means of the sensor, and may be configured to remove a ghost which is present in the region, thus improving the ride quality of a user during autonomous driving.

Figure 3:
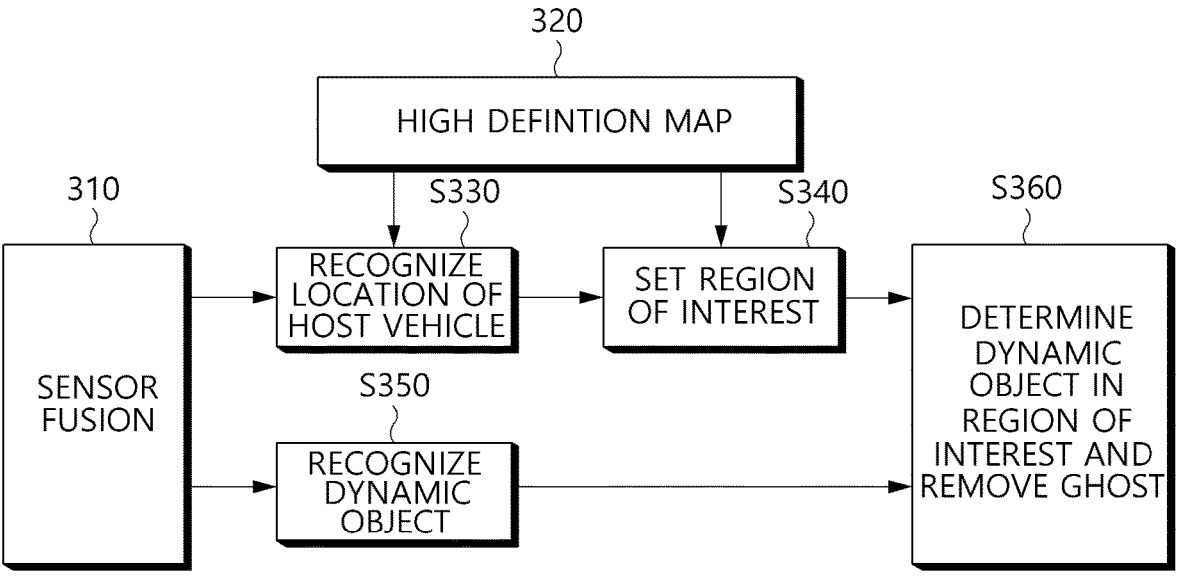
FIG. 3 illustrates removing a ghost in an apparatus configured to prevent misrecognition of an object in a vehicle and a method therefor according to an exemplary embodiment of the present disclosure.

FIG. 3 illustrates removing a ghost in an apparatus configured to prevent misrecognition of an object in a vehicle and a method therefor according to an exemplary embodiment of the present disclosure.

In the apparatus configured to prevent the misrecognition of the object in the vehicle and the method therefor according to an exemplary embodiment, in S330, a processor may be configured to determine (or recognize) a location of a host vehicle based on data obtained by means of sensor fusion 310 and a map 320.

According to an exemplary embodiment, in S340, the processor may be configured to set a region of interest in which a moving object (or a dynamic object) is unable to be present, based on the location of the host vehicle and the map 320.

According to an exemplary embodiment, in S350, the processor may be configured to detect (or recognize) a dynamic object based on the data obtained by means of the sensor fusion 310.

According to an exemplary embodiment, in S360, when it is determined there is the dynamic object in the region of interest, the processor may be configured to remove a ghost corresponding to the dynamic object.

Figure 4:
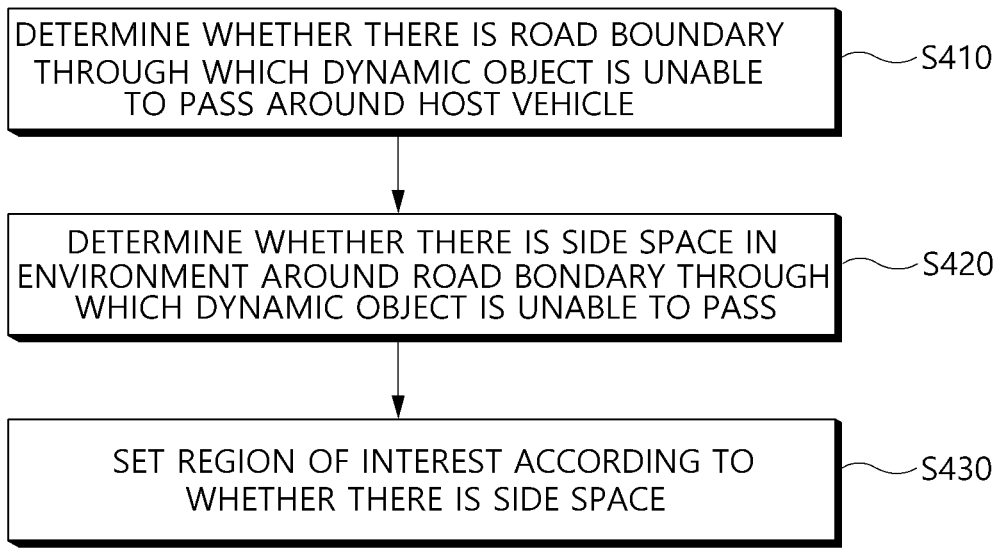
FIG. 4 is a flowchart illustrating setting a region of interest in an apparatus configured to prevent misrecognition of an object in a vehicle and a method therefor according to an exemplary embodiment of the present disclosure.

FIG. 4 is a flowchart illustrating setting a region of interest in an apparatus configured to prevent misrecognition of an object in a vehicle and a method therefor according to an exemplary embodiment of the present disclosure.

Operations in S410 to S430 in an exemplary embodiment below may be sequentially performed, but are not necessarily sequentially performed. For example, an order of the respective operations may be changed, and at least two operations may be performed in parallel.

Referring to FIG. 4, in the apparatus configured to prevent the misrecognition of the object in the vehicle and the method therefor according to an exemplary embodiment of the present disclosure, in S410, the processor may be configured to determine whether there is a road boundary through which a dynamic object is unable to pass around a host vehicle.

According to an exemplary embodiment, to set a region of interest where the dynamic object is unable to be present, the processor may be configured to obtain information about a road boundary around the vehicle based on a location of the vehicle and map data.

According to an exemplary embodiment, the information about the road boundary may comprise information about at least one of a first road boundary through which a dynamic object is unable to pass or a second road boundary through which the dynamic object is able to pass.

For example, the first road boundary through which the dynamic object is unable to pass may comprise at least one of a guardrail, a wall, or an upper structure.

Furthermore, for example, the second road boundary through which the dynamic object is able to pass may comprise at least one of a curb stone or an eye-catching rod.

According to an exemplary embodiment, in S420, the processor may be configured to determine whether there is a side space in an environment around the road boundary through which the dynamic object is unable to pass.

According to an exemplary embodiment, the processor may be configured to determine that there is the first road boundary through which the dynamic object is unable to pass, based on the information about the road boundary.

According to an exemplary embodiment, when it is determined that there is the first road boundary, the processor may be configured to collect environmental information around the vehicle based on the location of the vehicle and the map data to set a region of interest.

According to an exemplary embodiment, the processor may be configured to determine whether there is a side space around the road boundary based on the environmental information around the vehicle.

For example, the case where it is determined as an environment where there is the side space may comprise the case where there is a guardrail around the vehicle and the side space is a forest.

Furthermore, for example, the case where it is determined as the environment where there is the side space may comprise the case where there is a road in an opposite direction.

For another example, the case where it is determined as an environment where there is no side space may comprise the case where there is nothing next to the driving lane of the vehicle or the case where there is a wall (e.g., a soundproof wall) around the vehicle and the side space is a structure (e.g., a building).

According to an exemplary embodiment, in S430, the processor may be configured to set a region of interest depending on whether there is the side space.

According to an exemplary embodiment, when it is determined that there is the side space, the processor may be configured to set a width of the region of interest to a first value based on a width of the driving lane of the vehicle.

According to an exemplary embodiment, when it is determined that there is the side space, the processor may be configured to set the width of the region of interest to a first multiple (e.g., 1.5 times) of the width of the driving lane of the vehicle.

According to an exemplary embodiment, when it is determined that there is no side space, the processor may be configured to set the width of the region of interest to a second value less than the first value, based on the width of the driving lane of the vehicle.

According to an exemplary embodiment, when it is determined that there is no side space, the processor may be configured to set the width of the region of interest to a second multiple (e.g., 0.5 times) of the width of the road of the vehicle.

Figure 5:
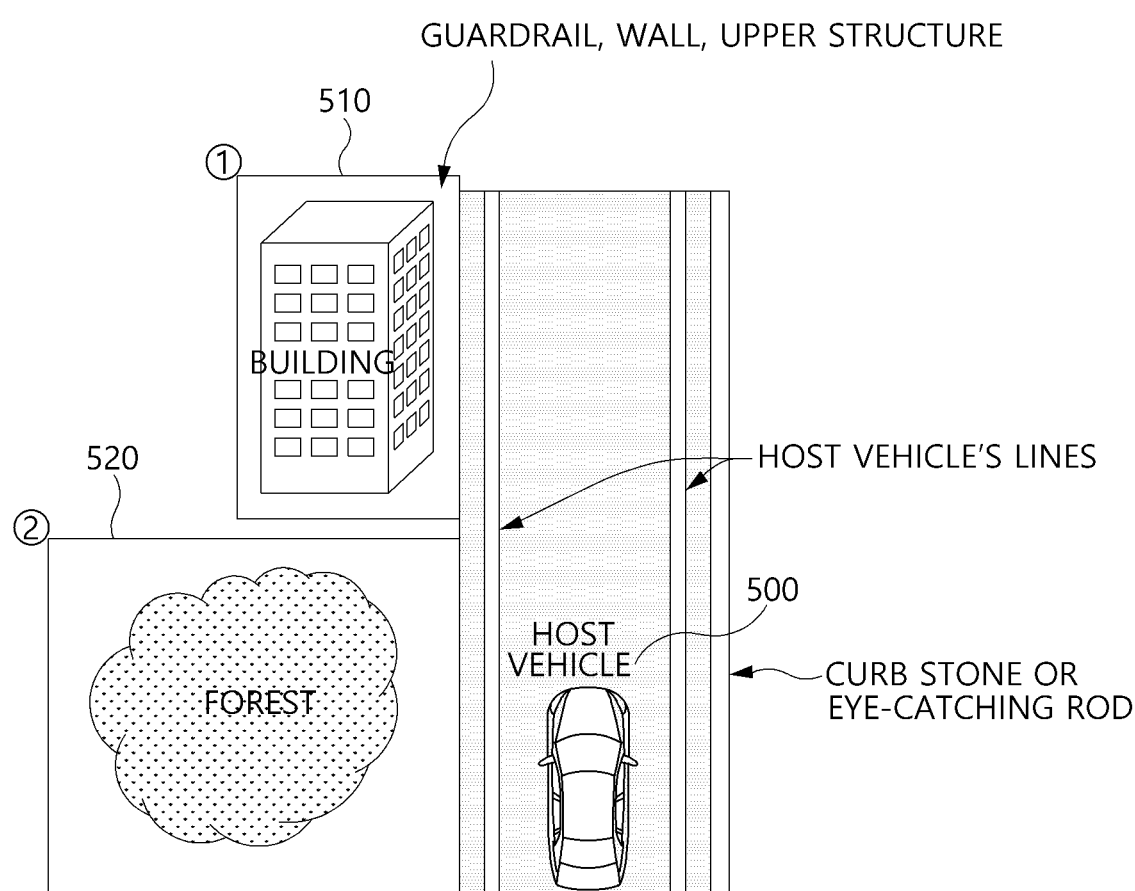
FIG. 5 illustrates setting a region of interest in an apparatus configured to prevent misrecognition of an object in a vehicle and a method therefor according to an exemplary embodiment of the present disclosure.

FIG. 5 illustrates setting a region of interest in an apparatus configured to prevent misrecognition of an object in a vehicle and a method therefor according to an exemplary embodiment of the present disclosure.

Referring to FIG. 5, the apparatus configured to prevent the misrecognition of the object in the vehicle according to an exemplary embodiment may be configured to determine whether there is a road boundary through which a dynamic object is unable to pass around a host vehicle 500.

According to an exemplary embodiment, to set a region of interest where the dynamic object is unable to be present, the apparatus configured to prevent the misrecognition of the object in the vehicle may be configured to obtain information about a road boundary around the host vehicle 500 based on a location of the host vehicle 500 and map data.

According to an exemplary embodiment, the information about the road boundary may comprise information about at least one of a first road boundary through which the dynamic object is unable to pass or a second road boundary through which the dynamic object is able to pass.

For example, the first road boundary through which the dynamic object is unable to pass may comprise at least one of a guardrail, a wall, or an upper structure.

Furthermore, for example, the second road boundary through which the dynamic object is able to pass may comprise at least one of a curb stone or an eye-catching rod.

According to an exemplary embodiment, the apparatus configured to prevent the misrecognition of the object in the vehicle may be configured to determine whether there is a side space in an environment around the road boundary through which the dynamic object is unable to pass.

According to an exemplary embodiment, the apparatus configured to prevent the misrecognition of the object in the vehicle may be configured to determine that there is a road boundary (e.g., a wall) through which the dynamic object is unable to pass around the vehicle and that there is a first structure 510 (e.g., a building) around the road boundary.

According to an exemplary embodiment, the apparatus configured to prevent the misrecognition of the object in the vehicle may be configured to determine that there is a road boundary (e.g., a guardrail) through which the dynamic object is unable to pass around the vehicle and that there is a second side space 520 (e.g., a forest) around the road boundary.

According to an exemplary embodiment, when it is determined that there is the first structure 510 (e.g., the building) around the road boundary, the apparatus configured to prevent the misrecognition of the object in the vehicle may be configured to set a width of the region of interest to 0.5 times the width of the driving lane of the host vehicle 500.

According to an exemplary embodiment, when it is determined that there is the second side space 520 (e.g., the forest) around the road boundary, the apparatus configured to prevent the misrecognition of the object in the vehicle may be configured to set the width of the region of interest to 1.5 times the width of the driving lane of the host vehicle 500.

However, the width of the region of interest is not limited to being set to 0.5 times or 1.5 times the width of the driving lane, which may be variously set based on the width (or length) of the driving lane.

Furthermore, that the apparatus configured to prevent the misrecognition of the object in the vehicle sets the width of the region of interest is an example of setting a size of the region of interest, but not limited thereto. The size of the region of interest may be set according to various criteria.

The case where the width of the region of interest is set based on the width of the driving lane is an example. The width of the region of interest may be set according to another criterion (e.g., a width of the vehicle, a width of the entire road, or the like).

Figure 6:
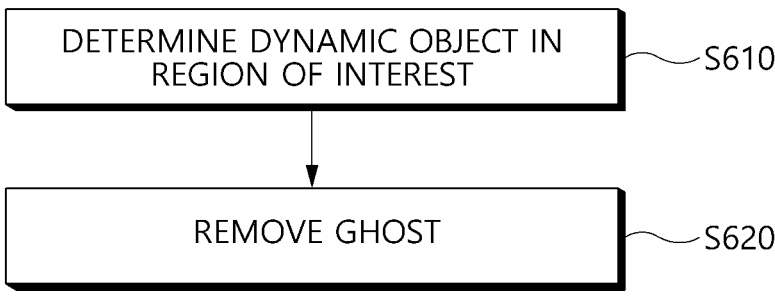
FIG. 6 is a flowchart illustrating removing a ghost in an apparatus configured to prevent misrecognition of an object in a vehicle and a method therefor according to an exemplary embodiment of the present disclosure.

FIG. 6 is a flowchart illustrating removing a ghost in an apparatus configured to prevent misrecognition of an object in a vehicle and a method therefor according to an exemplary embodiment of the present disclosure.

Operations in S610 and S620 in an exemplary embodiment below may be sequentially performed, but are not necessarily sequentially performed. For example, an order of the respective operations may be changed, and at least two operations may be performed in parallel.

Referring to FIG. 6, in the apparatus configured to prevent the misrecognition of the object in the vehicle and the method therefor according to an exemplary embodiment of the present disclosure, in S610, a processor may be configured to determine a dynamic object which is present in a region of interest.

According to an exemplary embodiment, the processor may be configured to set a region of interest through which the dynamic object is unable to pass, based on vehicle data collected by means of a sensor module and map data.

For example, the map data may comprise a centerline of a driving lane of the vehicle and a road boundary, and the centerline of the driving lane of the vehicle and the road boundary may comprise a set of points.

According to an exemplary embodiment, the processor may be configured to determine the dynamic object which is present in the region of interest. For example, the dynamic object may comprise at least one of a car, a passenger car, or a large-sized car. However, the present disclosure is not limited thereto. The dynamic object may comprise various moving objects.

According to an exemplary embodiment, in S620, the processor may be configured to remove a ghost corresponding to the dynamic object in the region of interest.

According to an exemplary embodiment, when the location of the dynamic object in the region of interest overlaps a road boundary through which the dynamic object is unable to pass, the processor may be configured to remove a ghost corresponding to the dynamic object.

According to an exemplary embodiment, when a straight line indicating a shortest distance between a boundary center point behind the dynamic object and a centerline of the driving lane of the vehicle is adjacent to the road boundary through which the dynamic object is unable to pass, the processor may be configured to remove the ghost corresponding to the dynamic object.

Figure 7A:
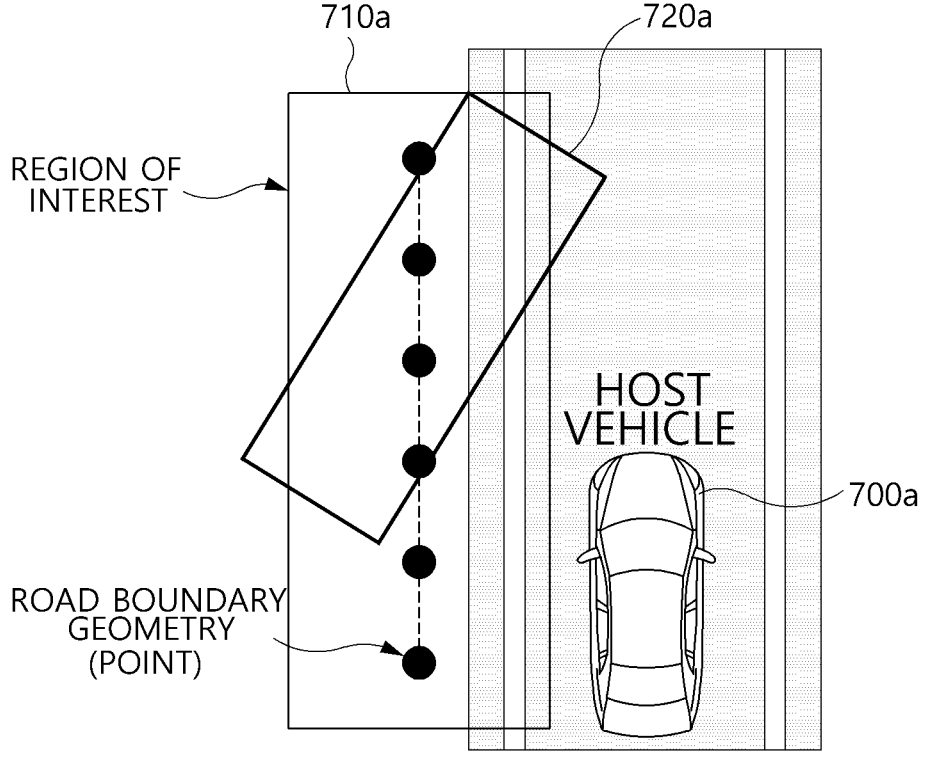
FIGS. 7A-7B illustrate removing a ghost in an apparatus configured to prevent misrecognition of an object in a vehicle and a method therefor according to an exemplary embodiment of the present disclosure.
Figure 7B:
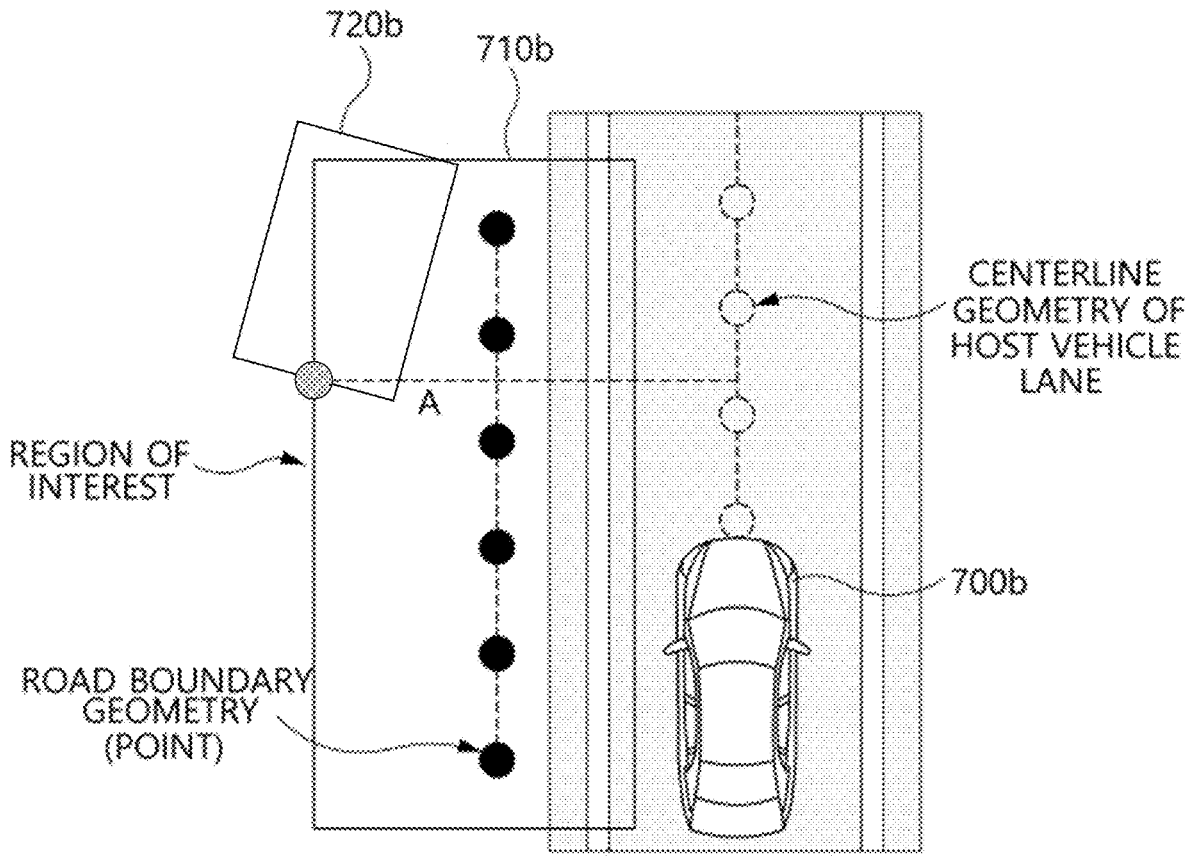

According to an exemplary embodiment, when the dynamic object is another vehicle, the processor may be configured to remove the ghost corresponding to the dynamic object, when the straight line indicating the shortest distance between a center point of a rear bumper of the other vehicle and the centerline of the driving lane of the vehicle is adjacent to the road boundary through which the dynamic object is unable to pass, FIGS. 7A and 7B illustrate removing a ghost in an apparatus configured to prevent misrecognition of an object in a vehicle and a method therefor according to an exemplary embodiment of the present disclosure.

Referring to FIG. 7A, the apparatus configured to prevent the misrecognition of the object in the vehicle may be configured to set a first region of interest 710a through which a moving object is unable to pass, based on vehicle data collected by means of a sensor module and map data.

For example, the map data may comprise a centerline of the driving lane of a vehicle 700a and a road boundary, and the centerline of the driving lane of the vehicle 700a and the road boundary may comprise a set of points.

According to an exemplary embodiment, the apparatus configured to prevent the misrecognition of the object in the vehicle may be configured to determine a first dynamic object 720a which is present in the first region of interest 710a. For example, the first dynamic object 720a may comprise at least one of a car, a passenger car, or a large-sized car. However, the present disclosure is not limited thereto. The first dynamic object 720a may comprise various moving objects.

According to an exemplary embodiment, the apparatus configured to prevent the misrecognition of the object in the vehicle may be configured to remove a ghost corresponding to the first dynamic object 720a in the first region of interest 710a.

According to an exemplary embodiment, when the location of the first dynamic object 720a in the first region of interest 710a overlaps a road boundary through which a moving object is unable to pass, the apparatus configured to prevent the misrecognition of the object in the vehicle may be configured to remove a ghost corresponding to the first dynamic object 720a.

Referring to FIG. 7B, the apparatus configured to prevent the misrecognition of the object in the vehicle may be configured to set a second region of interest 710b through which a moving object is unable to pass, based on vehicle data collected by means of a sensor module and map data.

For example, the map data may comprise a centerline of the driving lane of a vehicle 700b and a road boundary, and the centerline of the driving lane of the vehicle 700b and the road boundary may comprise a set of points.

According to an exemplary embodiment, the apparatus configured to prevent the misrecognition of the object in the vehicle may be configured to determine a second dynamic object 720b which is present in the second region of interest 710b. For example, the second dynamic object 720b may comprise at least one of a car, a passenger car, or a large-sized car. However, the present disclosure is not limited thereto. The second dynamic object 720b may comprise various moving objects.

According to an exemplary embodiment, the apparatus configured to prevent the misrecognition of the object in the vehicle may be configured to remove a ghost corresponding to the second dynamic object 720b in the second region of interest 710b.

According to an exemplary embodiment, when a straight line indicating a shortest distance between a boundary center point behind the second dynamic object 720b and the centerline of the driving lane of the vehicle 700b is adjacent to a road boundary through which a moving object is unable to pass, the apparatus configured to prevent the misrecognition of the object in the vehicle may be configured to remove a ghost corresponding to the second dynamic object 720b.

Figure 8:
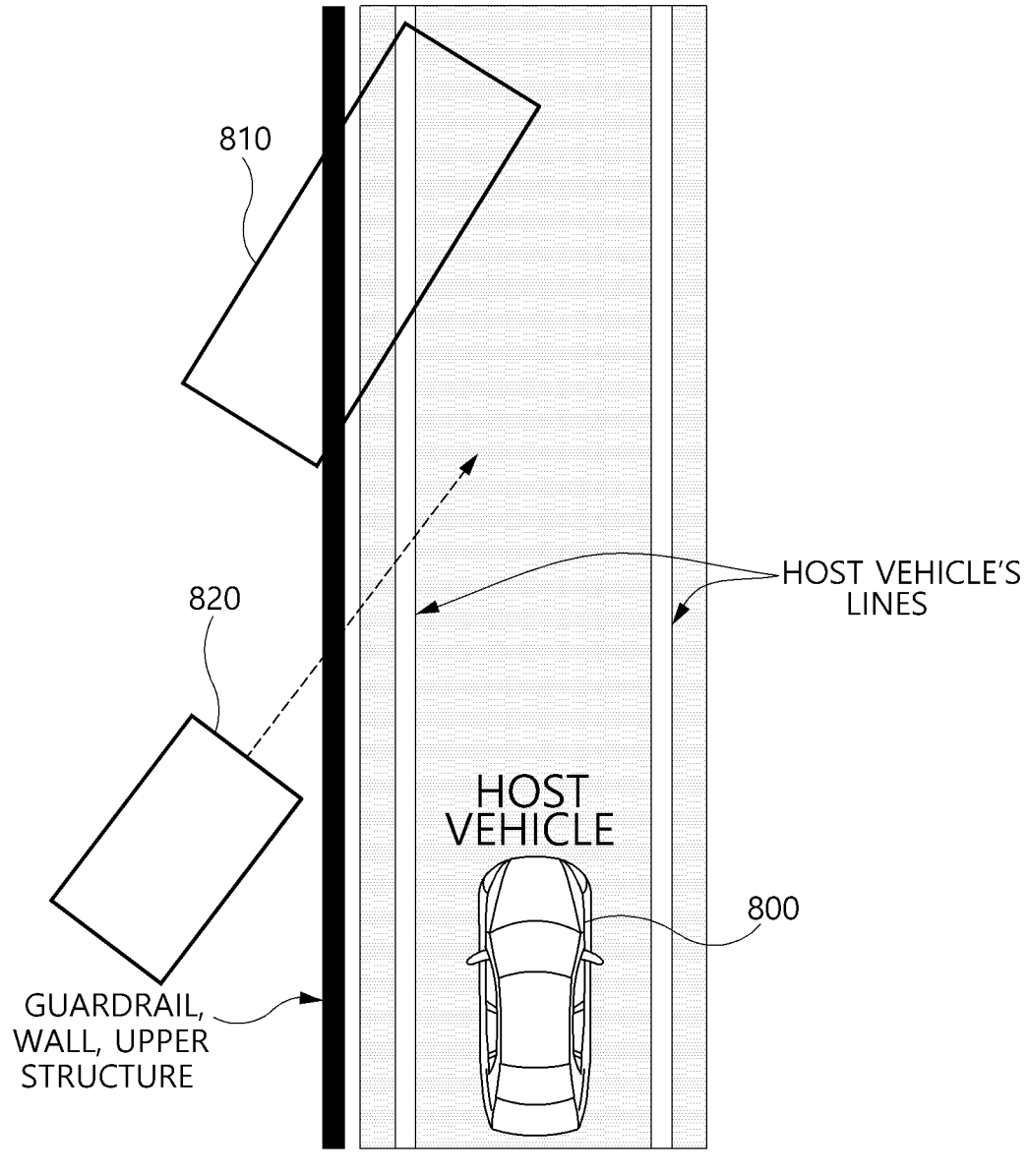
FIG. 8 illustrates removing a ghost in an apparatus configured to prevent misrecognition of an object in a vehicle and a method therefor according to an exemplary embodiment of the present disclosure.

According to an exemplary embodiment, when the second dynamic object 720b is another vehicle, the apparatus configured to prevent the misrecognition of the object in the vehicle may be configured to remove a ghost corresponding to the second dynamic object 720b, when the straight line indicating the shortest distance between a center point of a rear bumper of the second dynamic object 720b and a centerline of the driving lane of the vehicle 700b is adjacent to the road boundary through which the moving object is unable to pass, FIG. 8 illustrates removing a ghost in an apparatus configured to prevent misrecognition of an object in a vehicle and a method therefor according to an exemplary embodiment of the present disclosure.

Referring to FIG. 8, the apparatus configured to prevent the misrecognition of the object in the vehicle according to an exemplary embodiment may be configured to determine whether there is a road boundary through which a dynamic object is unable to pass around a host vehicle 800.

According to an exemplary embodiment, to set a region of interest where the dynamic object is unable to be present, the apparatus configured to prevent the misrecognition of the object in the vehicle may be configured to obtain information about a road boundary around the vehicle based on a location of the vehicle and map data.

According to an exemplary embodiment, the information about the road boundary may comprise information about a first road boundary through which the dynamic object is unable to pass.

For example, the first road boundary through which the dynamic object is unable to pass may comprise at least one of a guardrail, a wall, or an upper structure.

According to an exemplary embodiment, the apparatus configured to prevent the misrecognition of the object in the vehicle may be configured to determine that there is the first road boundary through which the dynamic object is unable to pass, based on the information about the road boundary.

According to an exemplary embodiment, when it is determined that there is the first road boundary, the apparatus configured to prevent the misrecognition of the object in the vehicle may be configured to set a region of interest based on the location of the vehicle and the map data.

According to an exemplary embodiment, when it is determined that there is a first dynamic object 810 in the region of interest and that the location of the first dynamic object 810 overlaps the driving lane of the host vehicle 800, the apparatus configured to prevent the misrecognition of the object in the vehicle may be configured to remove a ghost corresponding to the first dynamic object 810.

According to the above-mentioned embodiment, when it is determined that the location of the dynamic object in the region of interest overlaps a host vehicle lane, the apparatus configured to prevent the misrecognition of the object in the vehicle according to an exemplary embodiment of the present disclosure may be configured to remove a ghost for the dynamic object, thus preventing the host vehicle from decelerating because of misrecognizing the dynamic object as being in the host vehicle lane.

According to an exemplary embodiment, when it is determined that there is a second dynamic object 820 in the region of interest and that a predicted driving route of the second dynamic object 820 overlaps the driving lane of the host vehicle 800, the apparatus configured to prevent the misrecognition of the object in the vehicle may be configured to remove a ghost corresponding to the second dynamic object 820.

According to the above-mentioned embodiment, when it is determined that the predicted driving route of the dynamic object in the region of interest overlaps the host vehicle lane, the apparatus configured to prevent the misrecognition of the object in the vehicle according to an exemplary embodiment of the present disclosure may be configured to remove a ghost for the dynamic object, thus preventing the host vehicle from decelerating because of incorrectly predicting the dynamic object as being approaching the host vehicle lane.

Figure 9:
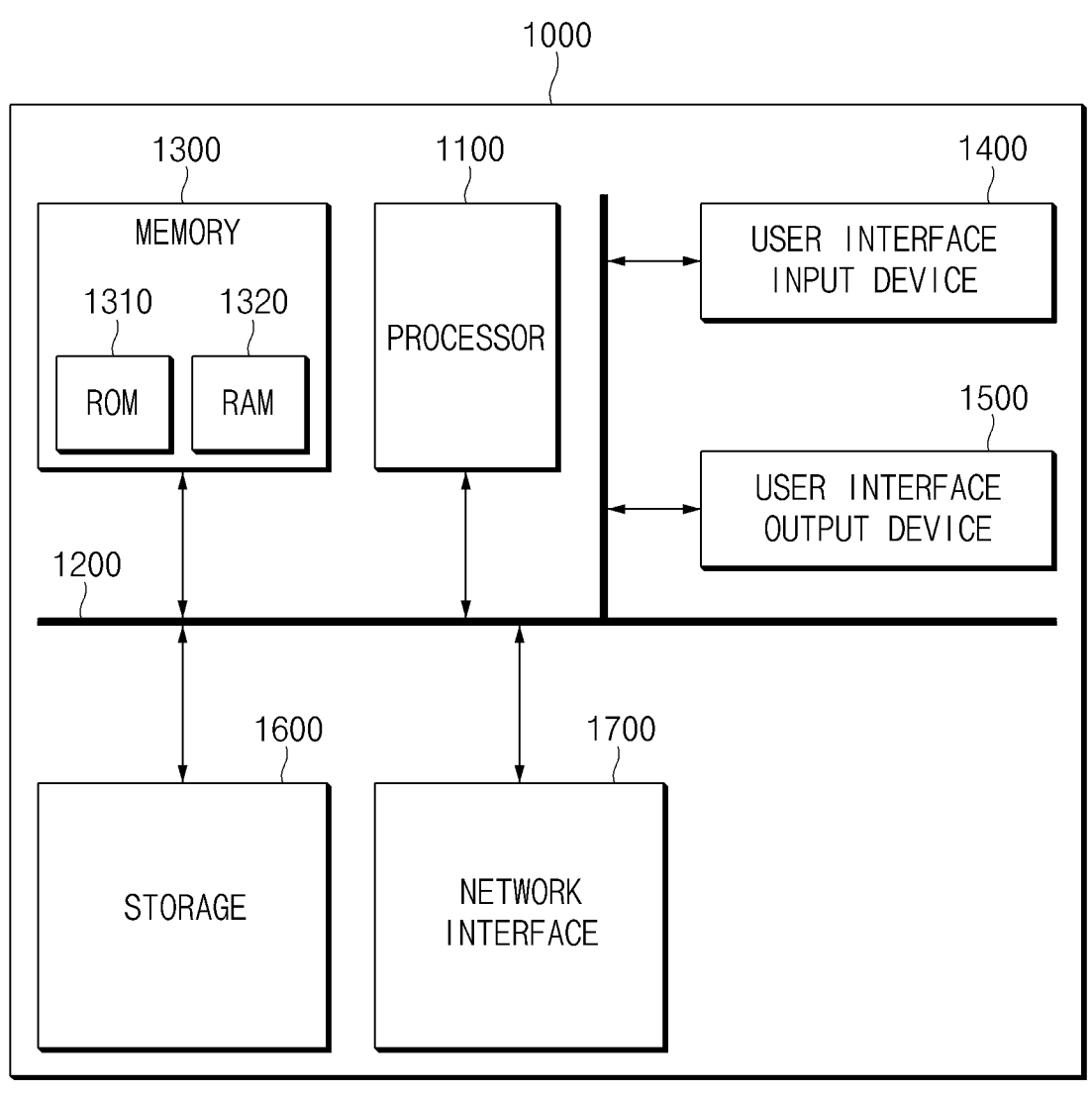
FIG. 9 illustrates a computing system about an apparatus configured to prevent misrecognition of an object in a vehicle and a method therefor according to an exemplary embodiment of the present disclosure.

FIG. 9 illustrates a computing system about an apparatus configured to prevent misrecognition of an object in a vehicle and a method therefor according to an exemplary embodiment of the present disclosure.

Referring to FIG. 9, a computing system 1000 about the apparatus configured to prevent the misrecognition of the object in the vehicle and the method therefor may comprise at least one processor 1100, a memory 1300, a user interface input device 1400, a user interface output device 1500, storage 1600, and a network interface 1700, which are connected with each other via a bus 1200.

The processor 1100 may comprise a central processing unit (CPU) or a semiconductor device that processes instructions stored in the memory 1300 and/or the storage 1600. The memory 1300 and the storage 1600 may comprise various types of volatile or non-volatile storage media. For example, the memory 1300 may comprise a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may be configured to read out information from the storage medium and may be configured to write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the apparatus configured to prevent the misrecognition of the object in the vehicle and the method therefor according to an exemplary embodiment of the present disclosure.

According to at least one of embodiments of the present disclosure, the apparatus configured to prevent the misrecognition of the object in the vehicle may be configured to determine a region where a dynamic object is unable to be present physically using a map and may be configured to remove a ghost which is present in the region, thus improving the ride quality of the user during autonomous driving.

Furthermore, according to at least one of embodiments of the present disclosure, the apparatus configured to prevent the misrecognition of the object in the vehicle may be configured to prevent a host vehicle from decelerating because of misrecognizing a ghost as being in a host vehicle lane.

Furthermore, according to at least one of embodiments of the present disclosure, the apparatus configured to prevent the misrecognition of the object in the vehicle may be configured to prevent the host vehicle from decelerating because of incorrectly predicting a ghost as approaching a host vehicle lane.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for preventing misrecognition of an object outside a vehicle, the apparatus comprising:
a sensor module configured to collect vehicle data, the sensor module including a radio detection and ranging (RADAR), a light detection and ranging (LIDAR), and a camera; and
at least one processor electrically connected to the sensor module, wherein the at least one processor is configured to:
set a first region through which a moving object is unable to pass, based on the vehicle data collected by the sensor module and map data;
remove noise corresponding to at least one moving object when the at least one moving object is detected in the first region;
obtain information about a road boundary around a vehicle based on a location of the vehicle and the map data to set the first region, wherein the information about the road boundary comprises:
information about at least one of a first road boundary through which the moving object is unable to pass, or
a second road boundary through which the moving object is able to pass; and
wherein the at least one moving object is another vehicle; and
wherein the at least on further configured to remove noise corresponding to the another vehicle, when a straight line indicating a shortest distance between a center point of a rear bumper corresponding to the another vehicle and a centerline of a driving lane of the vehicle intersects with the first road boundary.

2. The apparatus of claim 1, further comprising a memory, wherein:
the at least one processor is configured to:
determine a location of a vehicle, based on the vehicle data and the map data; and
set the first region based on the location of the vehicle and the map data, and the map data:
is stored in the memory; or
is received from outside of the vehicle.

3. The apparatus of claim 1, wherein:
the first road boundary through which the moving object is unable to pass comprises one or more of: a guardrail; a wall; and an upper structure, and
the second road boundary through which the moving object is able to pass comprises one or more of: a curb stone; and an eye-catching rod.

4. The apparatus of claim 1, wherein the at least one processor is configured to:
when it is determined that there is a road boundary through which the moving object is unable to pass, based on the information about the road boundary, collect environmental information around the vehicle based on the location of the vehicle and the map data to set the first region, and
determine whether there is a side space around the road boundary based on the environmental information around the vehicle;
wherein the environmental information around the vehicle is monitored in real-time.

5. The apparatus of claim 4, wherein:
the at least one processor is configured to:
set a width of the first region to a first value based on a width of a driving lane of the vehicle, when it is determined as an environment where there is the side space, and
set the width of the first region to a second value based on the width of the driving lane of the vehicle, when it is determined as an environment where there is no side space, and
the first value is greater than the second value.

6. The apparatus of claim 1, wherein:
the map data comprises a centerline of a driving lane of the vehicle and the road boundary, and
the centerline of the driving lane of the vehicle and the road boundary comprise a set of points.

7. The apparatus of claim 1, wherein the at least one processor is configured to:
determine that the at least one moving object is within the first region, when a location of the at least one moving object overlaps the first road boundary; and
remove noise corresponding to at least one moving object.

8. The apparatus of claim 1, wherein:
the sensor module comprises a sensor fusion system, and
the at least one processor is configured to fuse pieces of data collected in real time by means of the sensor fusion system to obtain the vehicle data.

9. A method for preventing misrecognition of an object outside a vehicle, the method comprising:
setting, by at least one processor, a first region through which a moving object is unable to pass, based on vehicle data collected using a sensor module and map data, wherein the sensor module includes a radio detection and ranging (RADAR), a light detection and ranging (LIDAR), and a camera;
removing, by the at least one processor, noise corresponding to at least one moving object, when the at least one moving object is detected in the first region;
obtaining, by the at least one processor, information about a road boundary around a vehicle based on a location of the vehicle and the map data to set the first region;
wherein the information about the road boundary comprises information about one or more of:
a first road boundary through which the moving object is unable to pass; or
a second road boundary through which the moving object is able to pass, wherein the at least one moving object is another vehicle; and wherein the removing of the noise corresponding to the at least one moving object comprises removing by the at least one processor, the noise corresponding to the another vehicle, when a straight line indicating a shortest distance between a center point of a rear bumper corresponding to the another vehicle and a centerline of a driving lane of the vehicle intersects with the first road boundary.

10. The method of claim 9, wherein the setting of the first region comprises:

determining, by the at least one processor, a location of a vehicle, based on the vehicle data and the map data; and setting, by the at least one processor, the first region based on the location of the vehicle and the map data, wherein the map data is stored in a memory or is received from outside of the vehicle.

11. The method of claim 9, wherein:

the first road boundary through which the moving object is unable to pass comprises one or more of: a guardrail; a wall; and an upper structure, and the second road boundary through which the moving object is able to pass comprises one or more of: a curb stone; and an eye-catching rod.

12. The method of claim 9, further comprising:

when it is determined that there is a road boundary through which the moving object is unable to pass, based on the information about the road boundary, collecting, by the at least one processor, environmental information around the vehicle based on the location of the vehicle and the map data to set the first region, and determining, by the at least one processor, whether there is a side space around the road boundary based on the environmental information around the vehicle;

wherein the environmental information around the vehicle is monitored in real-time.

13. The method of claim 12, further comprising:

setting, by the at least one processor, a width of the first region to a first value based on a width of a driving lane of the vehicle, when it is determined as an environment where there is the side space; and setting, by the least one processor, the width of the first region to a second value based on the width of the driving lane of the vehicle, when it is determined as an environment where there is no side space, wherein the first value is greater than the second value.

14. The method of claim 9, wherein:

the map data comprises a centerline of a driving lane of the vehicle and the road boundary, and the centerline of the driving lane of the vehicle and the road boundary comprise a set of points.

15. The method of claim 9, wherein the removing of the noise corresponding to the at least one moving object comprises:

determining, by the at least one processor, that the at least one moving object is within the first region when a location of the at least one moving object overlaps the first road boundary, and removing, by the at least one processor, the noise corresponding to the at least one moving object.

16. The method of claim 9, wherein the sensor module comprises a sensor fusion system, and further comprising:

fusing, by the at least one processor, pieces of data collected in real time by means of the sensor fusion system to obtain the vehicle data.

* * * * *